United States Patent
Jitsuhara

(10) Patent No.: US 7,627,228 B2
(45) Date of Patent: Dec. 1, 2009

(54) WIRELESS VIDEO TRANSMISSION SYSTEM

(75) Inventor: Tsutomu Jitsuhara, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 793 days.

(21) Appl. No.: 11/365,690

(22) Filed: Mar. 2, 2006

(65) Prior Publication Data

US 2006/0200844 A1 Sep. 7, 2006

(30) Foreign Application Priority Data

Mar. 4, 2005 (JP) .............................. 2005-060890

(51) Int. Cl.
*H04N 5/95* (2006.01)
(52) U.S. Cl. .......................................... 386/90; 386/85
(58) Field of Classification Search .................... 386/90, 386/85, 84, 46, 109, 124, 112, 40
See application file for complete search history.

(56) References Cited

U.S. PATENT DOCUMENTS 4,847,678 A * 7/1989 McCauley .................. 348/537

2004/0100583 A1 * 5/2004 Yoneno ....................... 348/537

FOREIGN PATENT DOCUMENTS

| CN | 2520615 Y | 11/2002 |
|---|---|---|
| GB | 2 300 778 A | 11/1996 |
| JP | 2003-309594 | 10/2003 |

* cited by examiner

*Primary Examiner*—Robert Chevalier
(74) *Attorney, Agent, or Firm*—Nixon & Vanderhye, P.C.

(57) ABSTRACT

A wireless video receiving apparatus is provided with a first voltage-controlled clock generation portion that can generate a video dot clock having a relatively high frequency and a second voltage-controlled clock generation portion that can generate a video dot clock having a relatively low frequency. A digital video signal compressed on the side of a transmitting apparatus is fed to a digital video signal decompression portion. The frequency of a horizontal synchronizing signal of an analog video signal fed to the side of a transmitting apparatus has been measured on the transmitting apparatus side, and a clock generated by the first or second voltage-controlled clock generation portion according to the frequency thus measured is fed to the digital video signal decompression portion, and then the compressed signal is decompressed.

3 Claims, 5 Drawing Sheets

WIRELESS VIDEO TRANSMISSION SYSTEM

This nonprovisional application claims priority under 35 U.S.C. §119(a) on Patent Application No. 2005-060890 filed in Japan on Mar. 4, 2005, the entire contents of which are hereby incorporated by reference.

BACKGROUND OF THE INVENTION

1. Field of the Invention

The present invention relates to a wireless video transmission system that wirelessly transmits a video signal, and more particularly to a wireless video transmission system that wirelessly transmits an analog video signal fed from the outside and restores the analog video signal on a receiving side thereof.

2. Description of Related Art

A conventional wireless video transmission system includes a wireless video transmitting apparatus 300 and a wireless video receiving apparatus 400. FIG. 3 is a block diagram showing the structure of the wireless video transmitting apparatus 300, and FIG. 4 is a block diagram showing the structure of the wireless video receiving apparatus 400. A video tape recorder (VTR), for example, is connected to an input side of the wireless video transmitting apparatus 300, and a television, for example, is connected to an output side of the wireless video receiving apparatus 400.

In the wireless video transmitting apparatus 300 shown in FIG. 3, an analog video signal outputted from the video tape recorder (VTR), for example, which is not shown in the drawing, is fed to an analog video signal input portion 302. The above-mentioned analog video signal is, for example, an NTSC (National Television Standards Committee) analog video signal recorded on video tape (recording medium). Hereinafter, the description will be continued on the assumption that the analog video signal to be fed to the analog video signal input portion 302 is an NTSC analog video signal.

The frequency of the horizontal synchronizing signal of the analog video signal fed to the analog video signal input portion 302 is in principle 15.734 kHz of the NTSC system, and accordingly the frequency corresponding to 1 dot of the analog video signal fed to the analog video signal input portion 302, that is, the frequency of a video dot clock of the analog video signal fed to the analog video signal input portion 302 is in principle 13.5 MHz (megahertz).

The analog video signal input portion 302 converts the analog video signal fed thereto to a digital video signal by using a sampling clock of 27 MHz (twice the frequency of 13.5 MHz).

The digital video signal converted by the analog video signal input portion 302 is compressed by a digital video signal compression portion 303. The compressed digital video signal is converted by a wireless control portion 304 to baseband signals of wireless packets, and is then converted to an analog in-phase and quadrature signal by a baseband processing circuit portion 305. The analog in-phase and quadrature signal is converted to a high-frequency signal by a wireless portion 306, and is then radiated (sent) from an antenna 307 as radio waves.

In the wireless video receiving apparatus 400 shown in FIG. 4, a high-frequency signal sent from the antenna 307 is received by an antenna 407, and is then converted to an analog in-phase and quadrature signal by a wireless portion 406. The converted in-phase and quadrature signal is converted to baseband signals by a baseband processing circuit portion 405, and is then converted to a compressed digital video signal by a wireless control portion 404. The compressed digital video signal is fed to a digital video signal decompression portion 403.

A voltage-controlled clock generation portion 408 is built as a phase locked loop (PLL) circuit composed of a phase comparator, a loop filter, and a voltage-controlled oscillator (VCXO) (none of which are not shown in the drawing). The voltage-controlled clock generation portion 408 generates a video dot clock of a frequency (in principle, 27 MHz) just twice the frequency of the video dot clock of the analog video signal fed to the analog video signal input portion 302 by referring to a control voltage fed from the digital video signal decompression portion 403.

The digital video signal decompression portion 403 decompresses the compressed digital video signal and thereby produces the original, uncompressed digital video signal while generating a horizontal synchronizing signal and a vertical synchronizing signal by using the video dot clock fed from the voltage-controlled clock generation portion 408. In a case where the frequency of the sampling clock used by the analog video signal input portion 302 is just 27 MHz, a frequency fH and a frequency fV of the horizontal synchronizing signal and the vertical synchronizing signal, respectively, generated by the digital video signal decompression portion 403 are given by formulae (1) and (2) below.

$$fH = 27 \text{ MHz} \div 1716 = 15.734 \text{ kHz} \quad (1)$$

$$fV = fH \div (525 \div 2) = 59.94 \text{ Hz} \quad (2)$$

The original, uncompressed digital video signal produced by the digital video signal decompression portion 403 is converted to an analog video signal by an analog video signal output portion 402, is then fed to a television or the like connected to the apparatus, and then video is reproduced therefrom.

Note that a main control portion 301 controls overall operation of the analog video signal input portion 302, the digital video signal compression portion 303, the wireless control portion 304, the baseband processing circuit portion 305, and the wireless portion 306. A main control portion 401 controls overall operation of the analog video signal output portion 402, the digital video signal decompression portion 403, the wireless control portion 404, the baseband processing circuit portion 405, and the wireless portion 406.

JP-A-2003-309594 (hereinafter referred to as Patent Publication 1) discloses a video information transmission system that transmits encoded video information. The video information transmission system includes dividing means that divides encoded video information into a plurality of divided data, a plurality of transmission terminals connected to the dividing means, the transmission terminals that transmit the divided data, a plurality of or a single base station that receives signals from the plurality of transmission terminals, a network to which the plurality of or the single base station is connected, switching receiving means that is connected to the network, the switching receiving means that receives the divided data received by the base station by using a plurality of lines, restoring means that obtains the divided data from the switching receiving means and restores the original video information, and decoding means that decodes the restored video information. The dividing means divides the encoded video information according to the level of importance thereof. Specifically, data with a high level of importance is divided or duplicated by the dividing means so that it can be transmitted over a plurality of transmission paths, and is then repeatedly transmitted by using a plurality of transmission terminals. On the other hand, data of a low level of importance is divided by the dividing means in such a way that it is transmitted over a single transmission path, and is then transmitted by using a single transmission terminal.

The frequency of the horizontal synchronizing signal of the analog video signal fed to the analog video signal input portion 302 is in principle equal to the specified frequency (fundamental frequency) of 15.734 kHz. In practice, however, it can slightly vary therefrom, and therefore the frequency of the video dot clock of the analog video signal fed to the analog video signal input portion 302 can also slightly vary from 13.5 MHz.

In general, the clock produced by the voltage-controlled oscillator (VCXO) is made to vary within a limited range (for example, within ±100 ppm of the reference frequency). When the analog video signal fed to the analog video signal input portion 302 is a signal obtained by reception of broadcasting, the frequency of the horizontal synchronizing signal varies from the specified frequency (15.734 kHz) only by a relatively small amount. This permits the voltage-controlled oscillator (VCXO) provided in the voltage-controlled clock generation portion 408 to generate a video dot clock having a frequency just twice the frequency of the video dot clock of the analog video signal fed to the analog video signal input portion 302.

However, when a source of the analog video signal is a video tape recorder, for example, the frequency of the horizontal synchronizing signal of the analog video signal fed to the analog video signal input portion 302 can vary from the specified frequency (15.734 kHz) by a relatively large amount (for example, ±120 ppm) due to variations in the speed at which the video tape runs, for example.

In that case, the voltage-controlled oscillator (VXCO) provided in the voltage-controlled clock generation portion 408 cannot generate a video dot clock having a frequency just twice the frequency of the video dot clock of the analog video signal fed to the analog video signal input portion 302, that is, a video dot clock required to decompress the compressed digital video signal. This results in a difference between the frequencies of the sampling clock used in the analog video signal input portion 302 and the video dot clock used for decompression, leading to an excess or deficiency of the amount of data when decompression is performed. This makes it impossible to obtain a normal digital video signal in the digital video signal decompression portion 403, and consequently it is impossible to reproduce a normal analog video signal in the analog video signal output portion 402.

On the other hand, the conventional example disclosed in Patent Publication 1 is a technique aimed at realizing an increase in the capacity of transmission and a reliable reception without placing a burden on a transmission path carrier, and therefore it is impossible to solve the above-described problem.

SUMMARY OF THE INVENTION

In view of the above-described problem, it is an object of the present invention to provide a wireless video transmission system that can reproduce a normal video signal even when the frequency of a synchronizing signal of an analog video signal fed thereto varies from a basic frequency by a relatively large amount.

To achieve the above object, according to the present invention, a wireless video transmission system is provided with a wireless video transmitting apparatus and a wireless video receiving apparatus. The wireless video transmitting apparatus includes an analog video signal input portion that converts an analog video signal fed from the outside to a digital video signal, a digital video signal compression portion that compresses the digital video signal thus converted and generates a compressed signal, a synchronizing signal frequency measurement portion that measures the frequency of a synchronizing signal of the analog video signal, and a transmission portion that wirelessly transmits a signal according to a measurement result of the synchronizing signal frequency measurement portion and the compressed signal. The wireless video receiving apparatus includes a reception portion that receives the signal according to the measurement result and the compressed signal, the signal and the compressed signal transmitted from the transmission portion, a digital video signal decompression portion that decompresses the compressed signal thus received into the original, uncompressed digital video signal, a first clock generation portion that can vary the frequency of a clock generated thereby within a predetermined first range, a second clock generation portion that can vary the frequency of a clock generated thereby within a second range that is different from the first range, and a selection portion that selects one of the first and second clock generation portions based on the measurement result. The digital video signal decompression portion performs decompression by using the clock generated by the clock generation portion selected by the selection portion.

With this structure, one of the first and second clock generation portions, which generate clocks having different frequency variable ranges, is selected according to the frequency of the horizontal synchronizing signal of the analog video signal fed to the analog video signal input portion.

For example, when the frequency of the horizontal synchronizing signal of the analog video signal fed to the analog video signal input portion is relatively large (high), the clock generation portion that can generate a clock having a relatively high frequency is selected. On the other hand, when the frequency of the horizontal synchronizing signal of the analog video signal fed to the analog video signal input portion is relatively small (low), the clock generation portion that can generate a clock having a relatively low frequency is selected.

This extends the variable range of a clock required to decompress a compressed signal, permitting the digital video signal decompression portion to decompress the compressed signal normally even when the frequency of the horizontal synchronizing signal of the analog video signal fed to the analog video signal input portion varies from a basic frequency (a fundamental frequency which is, for example, 15.734 kHz) by a relatively large amount. This makes it possible to reproduce a normal analog video signal.

Specifically, for example, the selection portion may select one of the first and second clock generation portions based on the result of comparison between the frequency of the synchronizing signal measured by the synchronizing signal frequency measurement portion and a predetermined first threshold value.

Preferably, the wireless video transmission system further includes a notification portion that provides notification of information according to the result of comparison between the frequency of the synchronizing signal measured by the synchronizing signal frequency measurement portion and a predetermined second threshold value.

Depending on the amount of variation, from the fundamental frequency, of the frequency of the horizontal synchronizing signal of the analog video signal fed to the analog video signal input portion, there may be cases where a compressed signal cannot be decompressed normally even by the use of one of the first and second clock generation portions, making it impossible to reproduce a normal analog video signal.

In that case, by providing the notification portion as described above and providing the second threshold value, for example, on the border between normal and abnormal reproduction of the analog video signal, when the compressed signal is not being decompressed normally because the frequency of the horizontal synchronizing signal varies from a certain fundamental frequency by a relatively large amount, the user gets notification (information) to that effect.

This permits the user to recognize that video is not being reproduced normally and understand why video has stopped being reproduced normally. Moreover, the user can get a clue on how to resume normal video reproduction.

DETAILED DESCRIPTION OF PREFERRED EMBODIMENTS

Figure 1:
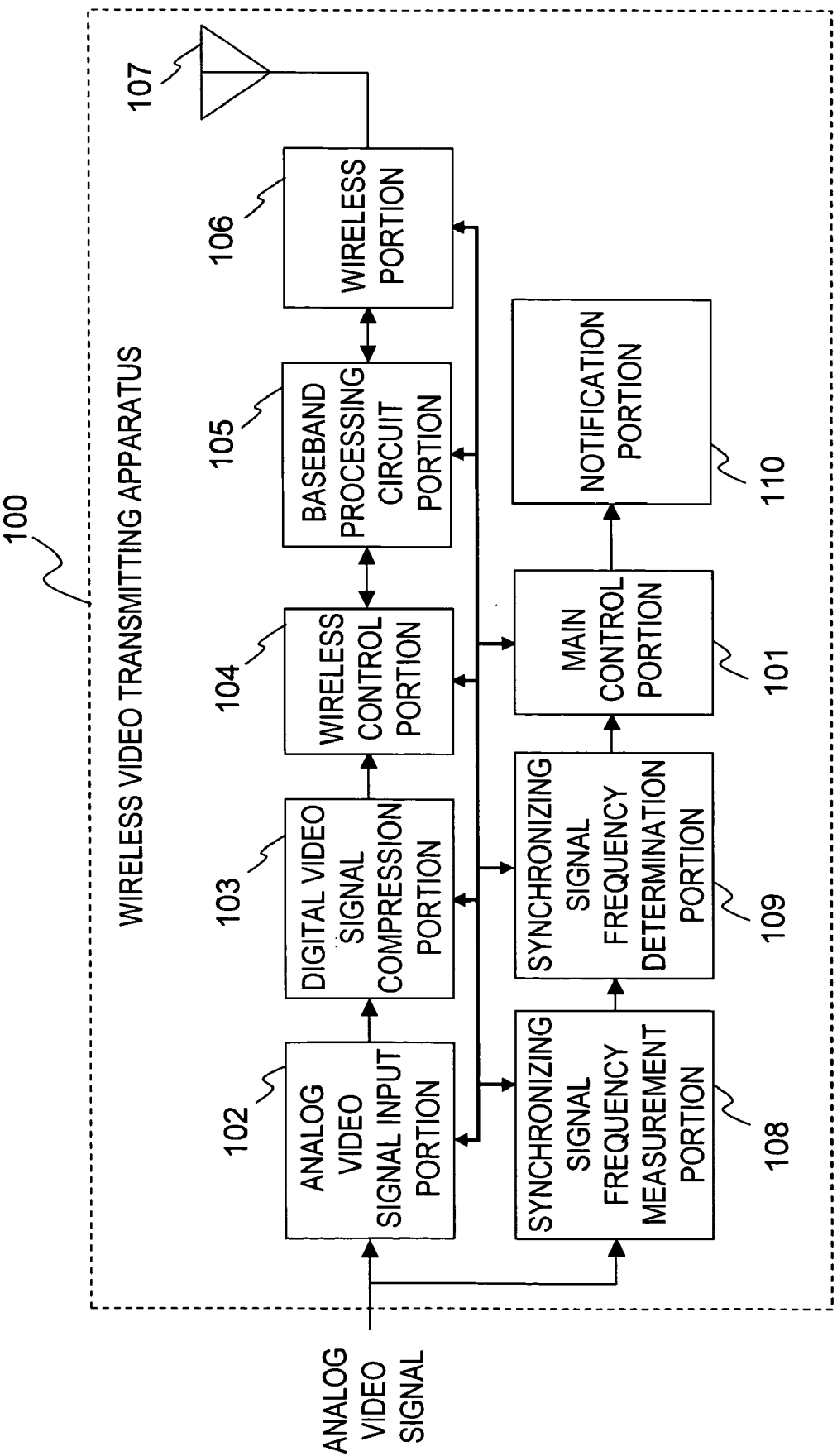
FIG. 1 is a block diagram showing the schematic structure of the wireless video transmitting apparatus in the wireless video transmission system of the present invention.
Figure 2:
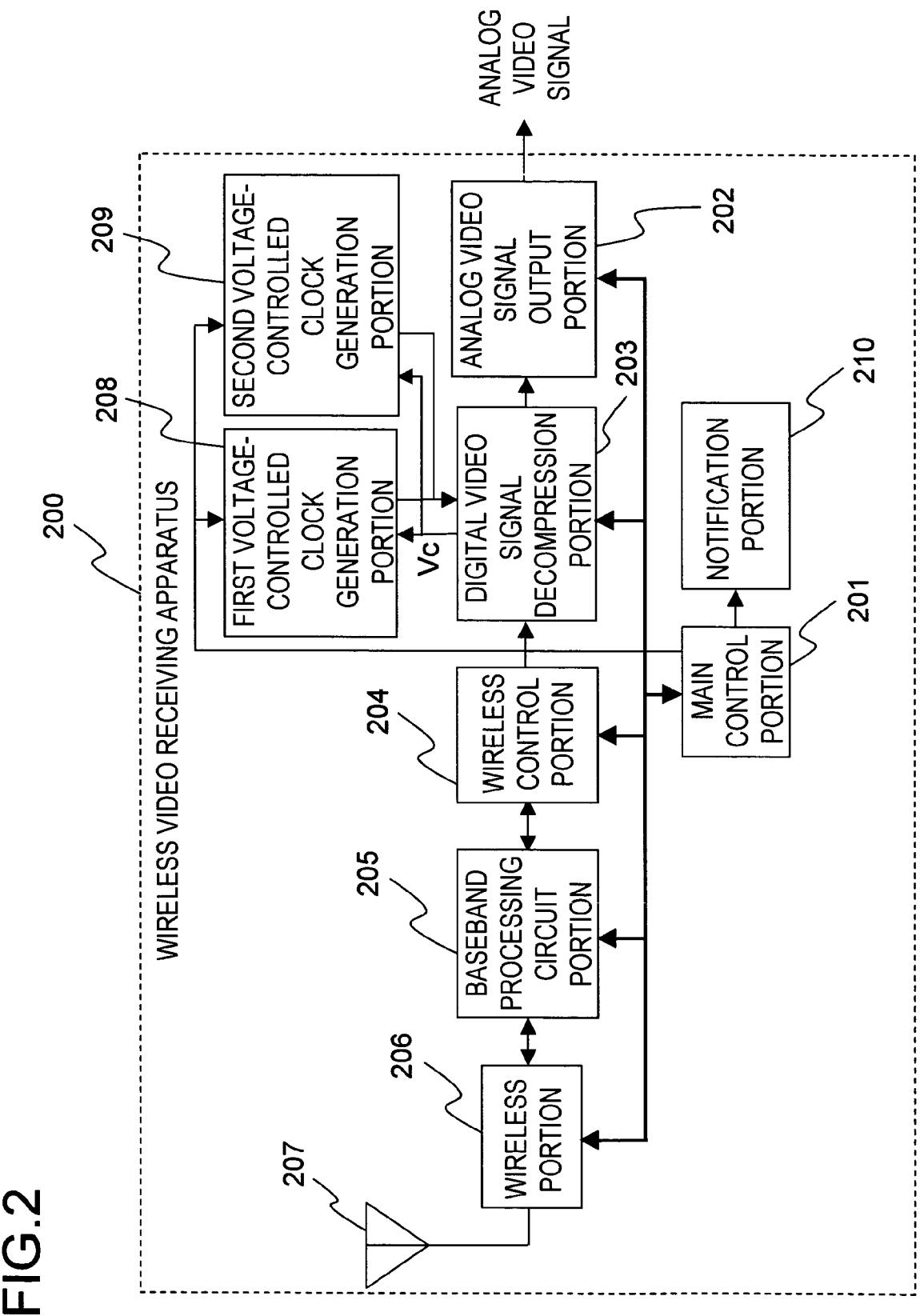
FIG. 2 is a block diagram showing the schematic structure of the wireless video receiving apparatus in the wireless video transmission system of the present invention.
Figure 3:
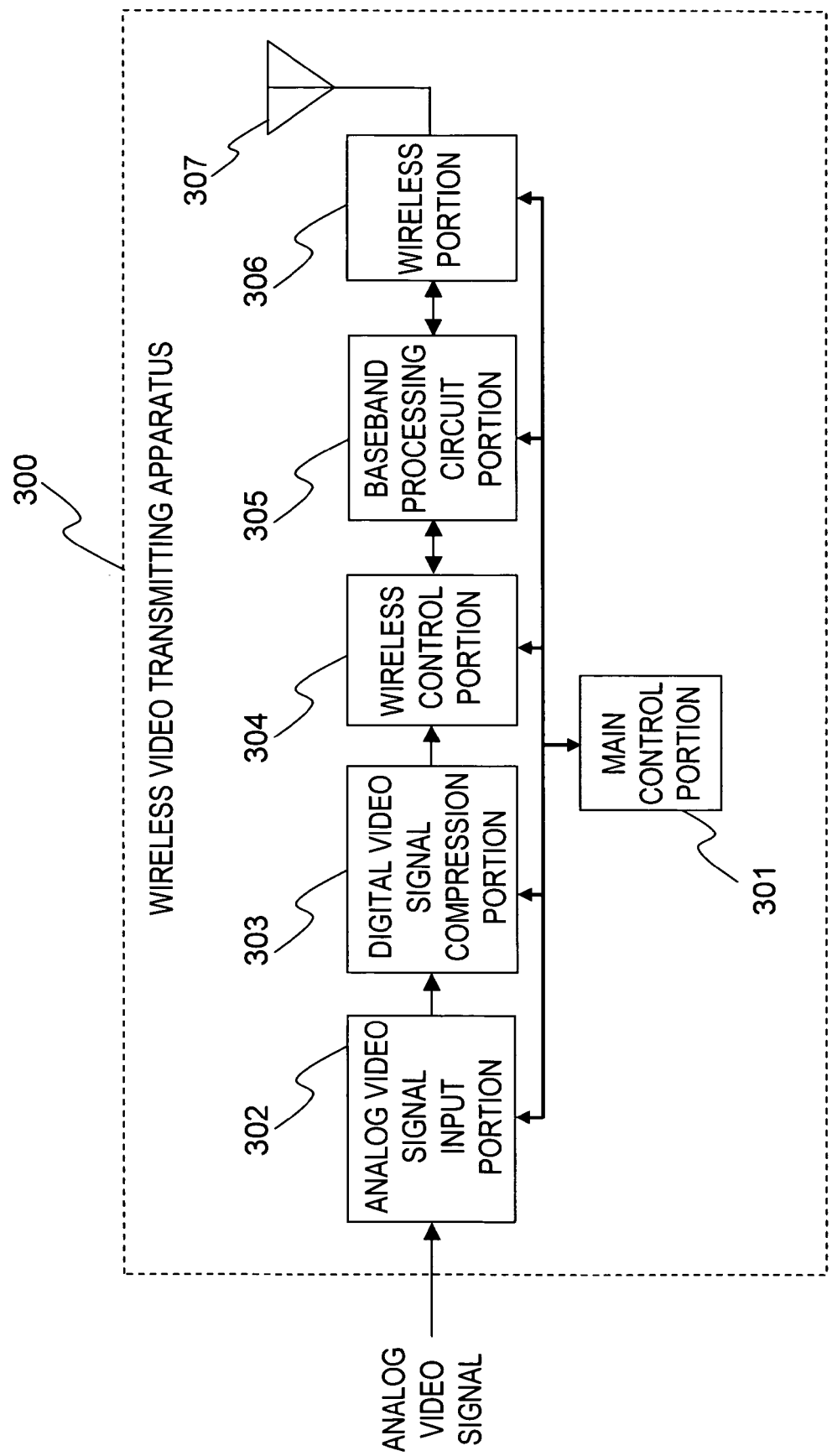
FIG. 3 is a block diagram showing the schematic structure of the wireless video transmitting apparatus in a conventional wireless video transmission system.
Figure 4:
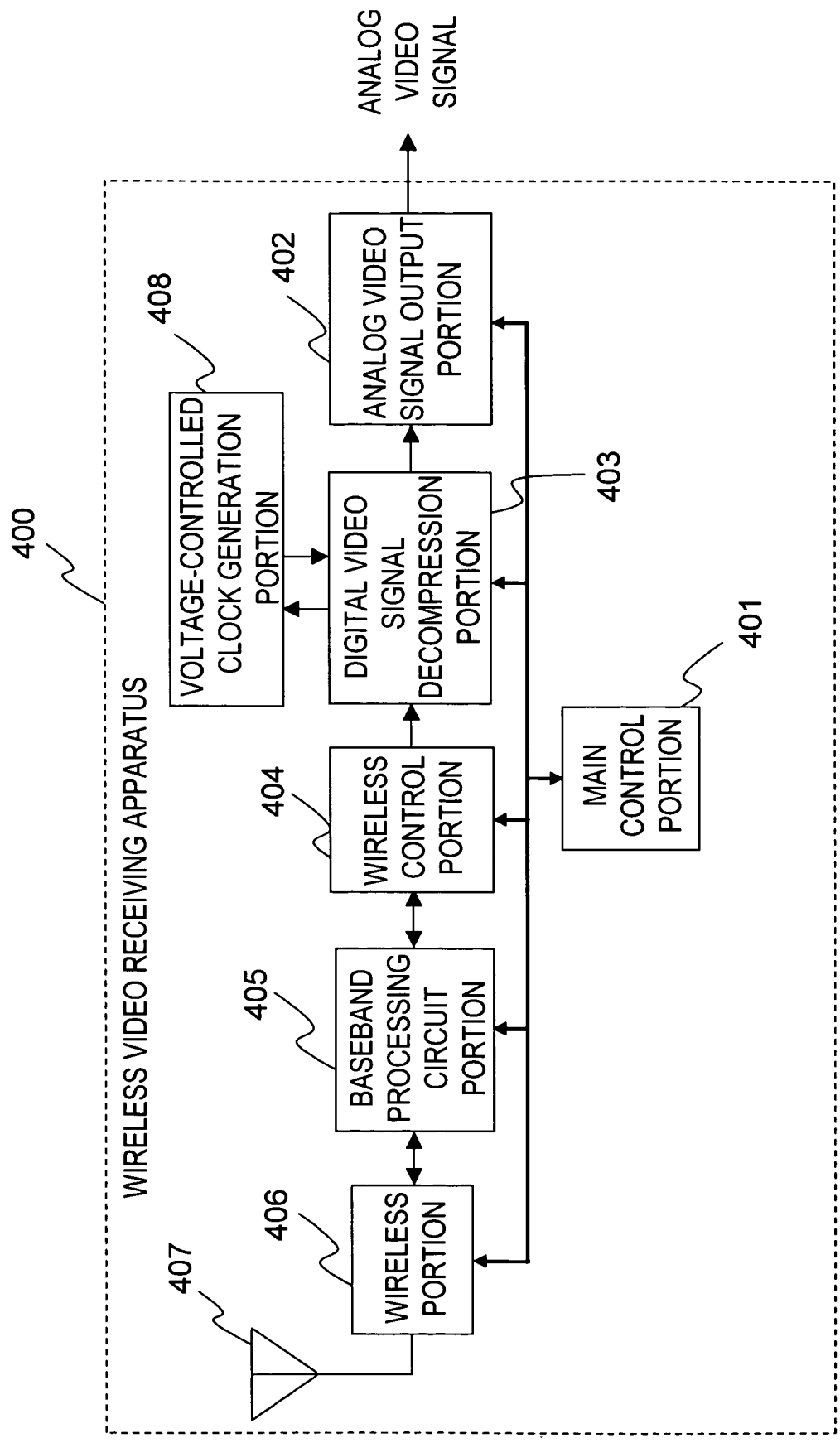
FIG. 4 is a block diagram showing the schematic structure of the wireless video receiving apparatus in the conventional wireless video transmission system.

Hereinafter, an example of an embodiment of the wireless video transmission system according to the present invention will be described with reference to the accompanying drawings. The wireless video transmission system according to the present invention includes a wireless video transmitting apparatus 100 and a wireless video receiving apparatus 200. FIG. 1 shows a block diagram of the wireless video transmitting apparatus 100, and FIG. 2 shows a block diagram of the wireless video receiving apparatus 200.

Description of Structure

First, the structures of the wireless video transmitting apparatus 100 and the wireless video receiving apparatus 200 will be described.

The wireless video transmitting apparatus 100 includes a main control portion 101, an analog video signal input portion 102, a digital video signal compression portion 103, a wireless control portion 104, a baseband processing circuit portion 105, a wireless portion 106, an antenna 107, a synchronizing signal frequency measurement portion 108, a synchronizing signal frequency determination portion 109, and a notification portion 110.

In the wireless video transmitting apparatus 100, an output side of the analog video signal input portion 102 is connected to an input side of the digital video signal compression portion 103, and an output side of the digital video signal compression portion 103 is connected to an input side of the wireless control portion 104. The wireless control portion 104 and the baseband processing circuit portion 105 are bi-directionally connected to each other, and the baseband processing circuit portion 105 and the wireless portion 106 are bi-directionally connected to each other. The antenna 107 is connected to the wireless portion 106. An output side of the synchronizing signal frequency measurement portion 108 is connected to an input side of the synchronizing signal frequency determination portion 109.

The main control portion 101 is bi-directionally connected to the analog video signal input portion 102, the digital video signal compression portion 103, the wireless control portion 104, the baseband processing circuit portion 105, the wireless portion 106, the synchronizing signal frequency measurement portion 108, and the synchronizing signal frequency determination portion 109.

The wireless video receiving apparatus 200 includes a main control portion 201 (a selection portion), an analog video signal output portion 202, a digital video signal decompression portion 203, a wireless control portion 204, a baseband processing circuit portion 205, a wireless portion 206, an antenna 207, a first voltage-controlled clock generation portion (a first clock generation portion) 208, a second voltage-controlled clock generation portion (a second clock generation portion) 209, and a notification portion 210.

In the wireless video receiving apparatus 200, the wireless portion 206 is connected to the antenna 207. The wireless portion 206 and the baseband processing circuit portion 205 are bi-directionally connected to each other, and the baseband processing circuit portion 205 and the wireless control portion 204 are bi-directionally connected to each other. An output side of the wireless control portion 204 is connected to an input side of the digital video signal decompression portion 203, and an output side of the digital video signal decompression portion 203 is connected to an input side of the analog video signal output portion 202. The first voltage-controlled clock generation portion 208 and the second voltage-controlled clock generation portion 209 are connected to the digital video signal decompression portion 203.

The main control portion 201 is bi-directionally connected to the analog video signal output portion 202, the digital video signal decompression portion 203, the wireless control portion 204, the baseband processing circuit portion 205, and the wireless portion 206.

Description of Operation

Next, operation of the wireless video transmitting apparatus 100 and the wireless video receiving apparatus 200 structured as described above will be described.

In the wireless video transmitting apparatus 100, an analog video signal outputted from a video tape recorder (VTR), for example, which is not shown in the drawing, is fed to the analog video signal input portion 102. The above-mentioned analog video signal is, for example, an NTSC (National Television Standards Committee) analog video signal recorded on video tape (recording medium). Hereinafter, the description will be continued on the assumption that the analog video signal to be fed to the analog video signal input portion 102 is an NTSC analog video signal. It is to be noted that any specific values (such as frequency) of this embodiment of the present invention are for illustration only and not limited to the examples specifically described below.

The frequency corresponding to 1 dot of the analog video signal fed to the analog video signal input portion 102, that is, the frequency of a video dot clock of the analog video signal fed to the analog video signal input portion 102 is in principle 13.5 MHz (megahertz). As described earlier, this frequency can slightly vary from 13.5 MHz. Thus, the frequency of the video dot clock of the analog video signal fed to the analog video signal input portion 102 is expressed by $(13.5 \pm \Delta f)$ MHz. The value of $\Delta f$ can vary within the range of $\pm 120$ ppm (parts per million) of 13.5 MHz.

The analog video signal input portion 102 converts the analog video signal fed thereto to a digital video signal by using a sampling clock of (27±2·Δf) MHz. The analog video signal input portion 102 obtains the value of Δf based on the synchronizing signal frequency (for example, the frequency of the horizontal synchronizing signal) of the analog video signal fed thereto, and then generates a sampling clock of (27±2·Δf) MHz.

The digital video signal compression portion 103 compresses, by a method, for example, conforming to MPEG (Moving Picture Experts Group), the digital video signal converted by the analog video signal input portion 102, and thus generates a compressed digital video signal (hereinafter referred to as a "compressed signal"). The analog video signal (the digital video signal) or the compressed signal corresponding thereto includes a time stamp according to the frequency of the sampling clock used in the analog video signal input portion 102. Therefore, the generated compressed signal includes time information indicating that "the digital video signal fed to the digital video signal compression portion 103 is sampled using a sampling clock of (27±2·Δf) MHz" (hereinafter referred to as "time information A").

The wireless control portion 104 converts the compressed signal to a baseband signal of wireless packets, and the baseband processing circuit portion 105 converts the baseband signal to an analog in-phase and quadrature signal. This analog in-phase and quadrature signal is converted to a high-frequency signal by the wireless portion 106, and is then radiated (sent) from the antenna 107 as radio waves.

The synchronizing signal frequency measurement portion 108 detects (separates) the horizontal synchronizing signal of the analog video signal fed to the analog video signal input portion 102, and measures the frequency of the horizontal synchronizing signal. Hereinafter, the measured frequency of the horizontal synchronizing signal is referred to as "the frequency $fH_d$ of the horizontal synchronizing signal". Having received from the synchronizing signal frequency measurement portion 108 the measurement result of the frequency of the horizontal synchronizing signal, the synchronizing signal frequency determination portion 109 compares the measured frequency $fH_d$ of the horizontal synchronizing signal with a previously determined threshold value.

The above-mentioned threshold value includes a first threshold value used for selection between the first voltage-controlled clock generation portion (first clock generation portion) 208 and the second voltage-controlled clock generation portion (second clock generation portion) 209, which will be described later, and a second threshold value for controlling operation of the notification portion 110 and the notification portion 210, which will be described later.

For example, the first threshold value is set at 15.734 kHz, which is the same frequency as the NTSC horizontal synchronizing signal. The second threshold value will be described later.

The result (determination result) of comparison between the frequency $fH_d$ of the horizontal synchronizing signal and the first and second threshold values is fed to the main control portion 101, and, like the compressed signal, is then converted to a baseband signal of wireless packets by the wireless control portion 104. The baseband signal is then converted to an analog in-phase and quadrature signal by the baseband processing circuit portion 105, is then converted to a high-frequency signal by the wireless portion 106, and is then radiated (sent) from the antenna 107 as radio waves.

The wireless control portion 104, the baseband processing circuit portion 105, the wireless portion 106, and the antenna 107 serve as a transmission portion that wirelessly transmits, to the wireless video receiving apparatus 200, a signal indicating a determination result of the synchronizing signal frequency determination portion 109 (in other words, a signal according to the measurement result of the synchronizing signal frequency measurement portion 108) and the compressed signal. Note that this transmission portion can wirelessly transmit any signal other than the signal according to the measurement result and the compressed signal.

The main control portion 101 controls overall operation of the analog video signal input portion 102, the digital video signal compression portion 103, the wireless control portion 104, the baseband processing circuit portion 105, the wireless portion 106, the synchronizing signal frequency measurement portion 108, the synchronizing signal frequency determination portion 109, and the notification portion 110.

The wireless video receiving apparatus 200 receives the high-frequency signal sent from the wireless video transmitting apparatus 100 (the antenna 107) via the antenna 207. The high-frequency signal thus received is converted to an analog in-phase and quadrature signal by the wireless portion 206, is then converted to a baseband signal by the baseband processing circuit portion 205, and is then sent to the wireless control portion 204.

The wireless control portion 204 converts the baseband signal fed thereto to the signal (data) indicating the determination result of the synchronizing signal frequency determination portion 109 and the compressed signal, feeds the signal indicating the determination result of the synchronizing signal frequency determination portion 109 (that is, the result of comparison between the frequency $fH_d$ of the horizontal synchronizing signal and the first and second threshold values) to the main control portion 201, and feeds the compressed signal to the digital video signal decompression portion 203.

Part composed of the antenna 207 and the wireless portion 206, part composed of the antenna 207, the wireless portion 206, and the baseband processing circuit portion 205, or part composed of the antenna 207, the wireless portion 206, the baseband processing circuit portion 205, and the wireless control portion 204 serves as a reception portion that receives the signal indicating the determination result of the synchronizing signal frequency determination portion 109 (in other words, the signal according to the measurement result of the synchronizing signal frequency measurement portion 108) and the compressed signal.

The main control portion 201 recognizes, from the signal (data) indicating the determination result fed from the wireless control portion 204, the frequency (the determination result about the frequency) of the horizontal synchronizing signal of the analog video signal fed to the analog video signal input portion 102. Then, based on the determination result (in other words, the measurement result of the synchronizing signal frequency measurement portion 108), the main control portion 201 selects one of the first voltage-controlled clock generation portion 208 and the second voltage-controlled clock generation portion 209, and then makes the selected voltage-controlled clock generation portion (the first voltage-controlled clock generation portion 208 or the second voltage-controlled clock generation portion 209) to operate.

The first voltage-controlled clock generation portion 208 is built as a phase locked loop (PLL) circuit composed of a phase comparator, a loop filter, and a voltage-controlled oscillator (VCXO) (none of which are not shown in the drawing). When selected by the main control portion 201, the first voltage-controlled clock generation portion 208 generates a video dot clock of a frequency ((27±2·Δf) MHz) just twice the frequency ((13.5±Δf) MHz) of the video dot clock of the analog video signal fed to the analog video signal input portion 102 by referring to a control voltage Vc fed from the digital video signal decompression portion 203.

The second voltage-controlled clock generation portion 209 too is built as a phase locked loop (PLL) circuit composed of a phase comparator, a loop filter, and a voltage-controlled oscillator (VCXO) (none of which are not shown in the drawing). When selected by the main control portion 201, the second voltage-controlled clock generation portion 209 generates a video dot clock of a frequency ((27±2·Δf) MHz) just twice the frequency ((13.5±Δf) MHz) of the video dot clock of the analog video signal fed to the analog video signal input portion 102 by referring to a control voltage Vc fed from the digital video signal decompression portion 203.

The digital video signal decompression portion 203 adjusts the control voltage Vc to be fed to the first voltage-controlled clock generation portion 208 and the second voltage-controlled clock generation portion 209 so that the frequency of the video dot clock to be fed from the first voltage-controlled clock generation portion 208 or the second voltage-controlled clock generation portion 209 becomes equal to the frequency of (27±2·Δf) MHz recognized from the "time information A" included in the compressed signal fed thereto.

Then, the digital video signal decompression portion 203, by using the video dot clock which has been fed from the first voltage-controlled clock generation portion 208 or the second voltage-controlled clock generation portion 209 and adjusted thereby so as to be equal to the frequency of (27±2·Δf) MHz, decompresses the compressed signal and thereby produces the original, uncompressed digital video signal while generating a horizontal synchronizing signal and a vertical synchronizing signal each having an appropriate frequency. A frequency fH and a frequency fV of the horizontal synchronizing signal and the vertical synchronizing signal, respectively, generated by the digital video signal decompression portion 203 are given by formulae (3) and (4) below.

$$fH=(27\pm2\cdot\Delta f) \text{ MHz} \div 1716 \quad (3)$$

$$fV=fH\div(525\div2) \quad (4)$$

When the first voltage-controlled clock generation portion 208 is selected by the main control portion 201, the video dot clock generated by the first voltage-controlled clock generation portion 208 is fed to the digital video signal decompression portion 203, and is then used for decompressing the compressed signal. On the other hand, when the second voltage-controlled clock generation portion 209 is selected by the main control portion 201, the video dot clock generated by the second voltage-controlled clock generation portion 209 is fed to the digital video signal decompression portion 203, and is then used for decompressing the compressed signal.

Here, the frequency range of a video dot clock that can be generated by the first voltage-controlled clock generation portion 208 spans (27 MHz–27 MHz×20 ppm) to (27 MHz+27 MHz×180 ppm), for example. Specifically, the lowest frequency of a video dot clock generated by the first voltage-controlled clock generation portion 208 is limited to "a frequency obtained by subtracting a frequency of 27 MHz×20 ppm from 27 MHz", and the highest frequency thereof is limited to "a frequency obtained by adding 27 MHz×180 ppm to 27 MHz".

On the other hand, the frequency range of a video dot clock that can be generated by the second voltage-controlled clock generation portion 209 spans (27 MHz–27 MHz×180 ppm) to (27 MHz+27 MHz×20 ppm), for example. Specifically, the lowest frequency of the video dot clock generated by the second voltage-controlled clock generation portion 209 is limited to "a frequency obtained by subtracting 27 MHz×180 ppm from 27 MHz", and the highest frequency thereof is limited to "a frequency obtained by adding 27 MHz×20 ppm to 27 MHz".

The reason that the variable ranges of the video dot clocks generated by the first voltage-controlled clock generation portion 208 and the second voltage-controlled clock generation portion 209 are limited here is that the clocks produced by the voltage-controlled oscillators (VCXO) of these voltage-controlled clock generation portions are made to vary within a limited range.

Now, when the determination result of the synchronizing signal frequency determination portion 109 fed to the main control portion 201 indicates that "the frequency of the horizontal synchronizing signal of the analog video signal fed to the analog video signal input portion 102 is greater (higher) than the first threshold value (15.734 kHz)", the main control portion 201 selects the first voltage-controlled clock generation portion 208.

In this case, the digital video signal decompression portion 203 decompresses the compressed signal fed from the wireless control portion 204 into the original, uncompressed digital video signal by using the video dot clock of a frequency of (27±2·Δf) MHz generated by the first voltage-controlled clock generation portion 208, and then feeds the digital video signal obtained by decompression to the analog video signal output portion 202.

On the other hand, when the determination result of the synchronizing signal frequency determination portion 109 fed to the main control portion 201 indicates that "the frequency of the horizontal synchronizing signal of the analog video signal fed to the analog video signal input portion 102 is smaller (lower) than the first threshold value (15.734 kHz)", the main control portion 201 selects the second voltage-controlled clock generation portion 209.

In this case, the digital video signal decompression portion 203 decompresses the compressed signal fed from the wireless control portion 204 into the original, uncompressed digital video signal by using the video dot clock of a frequency of (27±2·Δf) MHz generated by the second voltage-controlled clock generation portion 209, and then feeds the digital video signal obtained by decompression to the analog video signal output portion 202.

The analog video signal output portion 202 converts the digital video signal fed thereto to an analog video signal. The analog video signal obtained by the analog video signal output portion 202 is fed to an external video display apparatus (such as a television), which is not shown in the drawing, and then video is displayed thereon.

As described above, the use of the first voltage-controlled clock generation portion 208 and the second voltage-controlled clock generation portion 209 permits the variable range of the video dot clock that can be fed to the digital video signal decompression portion 203 to be extended to a range of (27 MHz–27 MHz×180 ppm) to (27 MHz+27 MHz×180 ppm), for example, and the voltage-controlled clock generation portion having an appropriate frequency variable range is selected according to the frequency of the horizontal synchronizing signal of the analog video signal fed to the analog video signal input portion 102. This permits the wireless video receiving apparatus 200 to output a normal analog video signal even when the frequency of the horizontal synchronizing signal of the analog video signal fed to the analog video signal input portion 102 (that is, fed to the wireless video transmitting apparatus 100) varies from a specified frequency (for example, 15.734 kHz) by a relatively large amount.

Figure 5:
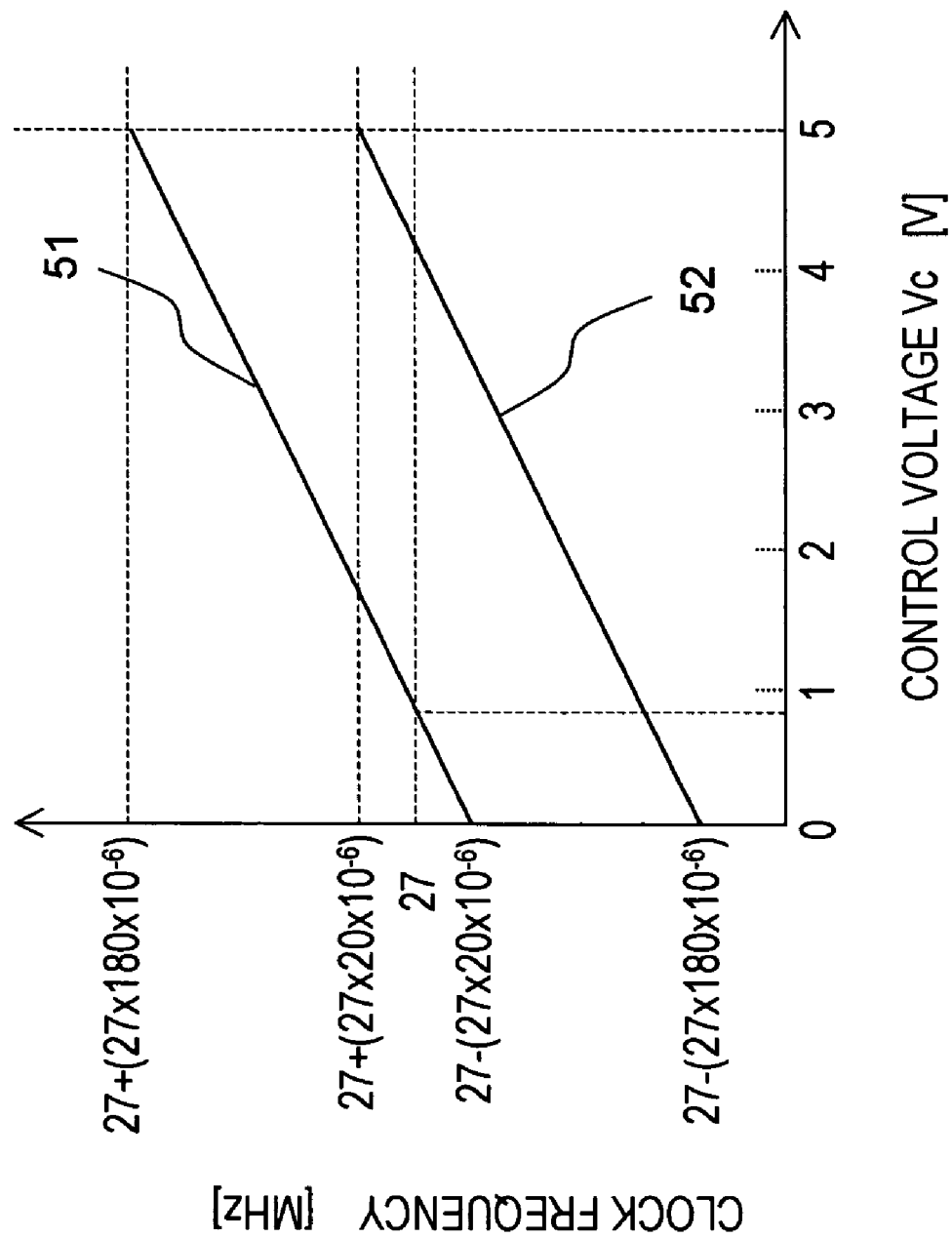
FIG. 5 is a graph showing the relationship between a control voltage outputted from the digital video signal decompression portion of FIG. 2 and the frequency of a generated video dot clock.

Hereinafter, how the control voltage Vc to be outputted from the digital video signal decompression portion 203 is adjusted will be described. FIG. 5 is a graph showing the relationship between the control voltage Vc and the frequency of a generated video dot clock. In FIG. 5, a line 51 represents the relationship between the control voltage Vc and the frequency of the video dot clock generated by the first voltage-controlled clock generation portion 208, and a line 52 represents the relationship between the control voltage Vc and the frequency of the video dot clock generated by the second voltage-controlled clock generation portion 209.

As indicated by the line 51, when the control voltage Vc is 0 volt (V), the first voltage-controlled clock generation portion 208 generates a video dot clock of a frequency of (27 MHz−27 MHz×20 ppm) and, as the control voltage Vc rises, it increases the frequency of the video dot clock. When the control voltage Vc is 5 V, the first voltage-controlled clock generation portion 208 generates a video dot clock of a frequency of (27 MHz+27 MHz×180 ppm), and, when the control voltage Vc is 0.8 V, it generates a video dot clock of a frequency of (27±0) MHz.

As indicated by the line 52, when the control voltage Vc is 0 V, the second voltage-controlled clock generation portion 209 generates a video dot clock of a frequency of (27 MHz−27 MHz×180 ppm), and, as the control voltage Vc rises, it increases the frequency of the video dot clock. When the control voltage Vc is 5 V, the second voltage-controlled clock generation portion 209 generates a video dot clock of frequency of (27 MHz+27 MHz×20 ppm).

For example, suppose that the first voltage-controlled clock generation portion 208 is selected by the main control portion 201. Then, the digital video signal decompression portion 203 first outputs a control voltage Vc of 0.8 V. This makes the first voltage-controlled clock generation portion 208 generate a video dot clock of a frequency of (27±0) MHz, and the digital video signal decompression portion 203 decompresses the compressed signal by using this video dot clock of a frequency of (27±0) MHz.

When the frequency of the sampling clock used by the analog video signal input portion 102 is (27±0) MHz, the value of the time stamp in the signal obtained by decompression agrees with the value of the time stamp in the compressed signal. This allows the digital video signal decompression portion 203 to maintain a control voltage Vc at 0.8 V.

In a case where the frequency of the sampling clock used by the analog video signal input portion 102 changes to a frequency of (27 MHz+27 MHz×180 ppm), the rate of the video dot clock generated by the first voltage-controlled clock generation portion 208 becomes slower than that of the sampling clock (that is, the frequency of the video dot clock generated by the first voltage-controlled clock generation portion 208 becomes smaller than that of the sampling clock), resulting in the difference between the value of the time stamp in the signal obtained by decompression and the value of the time stamp in the compressed signal. In that case, in order to eliminate the above difference, the digital video signal decompression portion 203 increases the control voltage Vc so as to be higher than 0.8 V (for example, increases it to 0.9 V).

The above-described comparison between the values of two different time stamps and an increase and decrease of the control voltage Vc are repeated until the value of the time stamp in the signal obtained by decompression agrees with the value of the time stamp in the compressed signal, and the control voltage Vc is stabilized at a voltage obtained when the values of two difference time stamps agree with each other. Specifically, the digital video signal decompression portion 203 increases the control voltage Vc up to 5 V so that the frequency of the video dot clock generated by the first voltage-controlled clock generation portion 208 becomes equal to (27 MHz+27 MHz×180 ppm).

The above description deals with a case where the first voltage-controlled clock generation portion 208 is selected by the main control portion 201. It should be understood, however, that the same operation is performed when the second voltage-controlled clock generation portion 209 is selected by the main control portion 201.

Notification Portion

Next, operation of the notification portion 110 and the notification portion 210 will be described. Hereinafter, the description will be continued on the assumption that the notification portion 110 and the notification portion 210 are each composed of an LED (light emitting diode), which is not shown in the drawing, that is so disposed as to permit a user (a viewer) to see a flashing light. Also, the description will be continued on the assumption that the frequency range of a video dot clock that can be generated by the first voltage-controlled clock generation portion 208 spans (27 MHz−27 MHz×20 ppm) to (27 MHz+27 MHz×180 ppm), and the frequency range of a video dot clock that can be generated by the second voltage-controlled clock generation portion 209 spans (27 MHz−27 MHz×180 ppm) to (27 MHz+27 MHz×20 ppm).

The second threshold value used for controlling the operation of the notification portion 110 and the notification portion 210 includes two different threshold values: a threshold value A and a threshold value B. For example, the threshold value A is set at (15.734 kHz−15.734 kHz×180 ppm), and the threshold value B is set at (15.734 kHz+15.734 kHz×180 ppm).

The synchronizing signal frequency determination portion 109 compares the frequency $fH_d$ of the horizontal synchronizing signal measured by the synchronizing signal frequency measurement portion 108 with the second threshold value (each of the threshold value A and the threshold value B), and then determines whether or not the following inequality (5) or (6) is satisfied. As mentioned before, the determination result thus obtained is transmitted to the main control portion 101 and to the main control portion 201.

(The frequency $fH_d$ of the horizontal synchronizing signal)<the threshold value A (5)

(The frequency $fH_d$ of the horizontal synchronizing signal)>the threshold value B (6)

When the inequality (5) is satisfied, the frequency $fH_d$ of the horizontal synchronizing signal is lower than (15.734 kHz−15.734 kHz×180 ppm), and therefore it is impossible (or it is not necessarily possible) to reproduce a normal analog video signal even when the second voltage-controlled clock generation portion 209 is selected in the wireless video receiving apparatus 200.

On the other hand, when the inequality (6) is satisfied, the frequency $fH_d$ of the horizontal synchronizing signal is higher than (15.734 kHz+15.734 kHz×180 ppm), and therefore it is impossible (or it is not necessarily possible) to reproduce a normal analog video signal even when the first voltage-controlled clock generation portion 208 is selected in the wireless video receiving apparatus 200.

Thus, when one of the inequalities (5) and (6) is satisfied, the main control portion 101 makes the LED of the notification portion 110 flash and the main control portion 201 makes the LED of the notification portion 210 flash so as to indicate that a normal analog video signal is not being reproduced. On the other hand, neither of the inequalities (5) and (6) is satisfied, the main control portion 101 leaves or turns the LED of the notification portion 110 off and the main control portion 201 leaves or turns the LED of the notification portion 210 off.

If video has suddenly stopped being reproduced normally without any notification, the user not only feels annoyed but also cannot get any information on how to reproduce video normally. However, the notification portion 110 and the notification portion 210 operating in a manner as described above permit, when a normal analog video signal is not being reproduced because the frequency $fH_d$ of the horizontal synchronizing signal varies from the specified frequency by a relatively large amount, the user to get notification (information) to that effect.

This permits the user to recognize that video is not being reproduced normally and understand why video has stopped being reproduced normally. Moreover, the user can get a clue on how to resume normal video reproduction.

Instead of making the LED turn on/off, it is possible to adopt various methods for notifying that "a normal analog video signal is not being reproduced". For example, it is possible to provide text notification using a liquid crystal display panel or the like, or provide audio notification using a sound source (such as a buzzer).

The main control portion 201 controls overall operation of the analog video signal output portion 202, the digital video signal decompression portion 203, the wireless control portion 204, the baseband processing circuit portion 205, the wireless portion 206, the first voltage-controlled clock generation portion 208, the second voltage-controlled clock generation portion 209, and the notification portion 210.

MODIFICATIONS

The above description deals with a case where the wireless video transmitting apparatus 100 includes the notification portion 110 and the wireless video receiving apparatus 200 includes the notification portion 210. It should be understood, however, that it is possible to provide only the notification portion 110 and omit the notification portion 210. Alternatively, it is possible to provide only the notification portion 210 and omit the notification portion 110.

The above description deals with a case where the synchronizing signal frequency determination portion 109 is provided on the side of the wireless video transmitting apparatus 100. It should be understood, however, that the synchronizing signal frequency determination portion 109 may be provided on the side of the wireless video receiving apparatus 200. In that case, the measurement result of the synchronizing signal frequency measurement portion 108 is wirelessly transmitted from the antenna 107 via the main control portion 101, the wireless control portion 104, the baseband processing circuit portion 105, and the wireless portion 106 so as to be received by the synchronizing signal frequency determination portion 109 provided on the side of the wireless video receiving apparatus 200 via the antenna 207, the wireless portion 206, the baseband processing circuit portion 205, and the wireless control portion 204.

The above description deals with a case where the video tape recorder is taken as an example of a source for supplying analog video signals to the analog video signal input portion 102. It should be understood, however, that such a source is not limited to the video tape recorder. For example, it may be a DVD (digital versatile disk) playback apparatus. When a deviation (in general, of the order of ±30 ppm) of the oscillating frequency of an oscillator used inside the DVD playback apparatus is relatively large, the same problem as in the case of using the video tape recorder as a source arises.

The above description deals with a case where only one first threshold value and two voltage-controlled clock generation portions (the first voltage-controlled clock generation portion 208 and the second voltage-controlled clock generation portion 209) are provided so that the selected voltage-controlled clock generation portion is made to operate according to the result of comparison between the frequency $fH_d$ of the horizontal synchronizing signal and the single threshold value (the first threshold value). It should be understood, however, that the first threshold value may be divided into a plurality of stages.

Specifically, the first threshold value may be divided into two (or three, four, . . . ) stages, and the magnitude of the frequency $fH_d$ of the horizontal synchronizing signal is then determined in three (or four, five, . . . ) stages. Preferably, there are provided three (or four, five, . . . ) voltage-controlled clock generation portions.

For example, when two (two-stage) threshold values C and D are provided as the first threshold value and three voltage-controlled clock generation portions "a", "b", and "c" are provided as the voltage-controlled clock generation portion, the threshold values C and D are set at, for example, (15.734 kHz−15.734 kHz×80 ppm) and (15.734 kHz+15.734 kHz×80 ppm), respectively, and the variable ranges of the video dot clocks generated by the voltage-controlled clock generation portions a, b, and c are, for example, (27 Hz−27 MHz×260 ppm) to (27 Hz−27 MHz×60 ppm), (27 Hz−27 MHz×100 ppm) to (27 Hz+27 MHz×100 ppm), and (27 Hz+27 MHz×60 ppm) to (27 Hz+27 MHz×260 ppm), respectively.

When "(the frequency $fH_d$ of the horizontal synchronizing signal)<the threshold value C", the voltage-controlled clock generation portion "a" provides a video dot clock to the digital video signal decompression portion 203. When "the threshold value C<(the frequency $fH_d$ of the horizontal synchronizing signal)<the threshold value D", the voltage-controlled clock generation portion "b" provides a video dot clock to the digital video signal decompression portion 203. And, when "the threshold value D<(the frequency $fH_d$ of the horizontal synchronizing signal)", the voltage-controlled clock generation portion "c" provides a video dot clock to the digital video signal decompression portion 203.

What is claimed is:

1. A wireless video transmission system comprising a wireless video transmitting apparatus and a wireless video receiving apparatus, wherein the wireless video transmitting apparatus includes
an analog video signal input portion that converts an analog video signal fed from an outside to a digital video signal,
a digital video signal compression portion that compresses the digital video signal thus converted and generates a compressed signal,
a synchronizing signal frequency measurement portion that measures a frequency of a synchronizing signal of the analog video signal, and
a transmission portion that wirelessly transmits a signal according to a measurement result of the synchronizing signal frequency measurement portion and the compressed signal, wherein the wireless video receiving apparatus includes
a reception portion that receives the signal according to the measurement result and the compressed signal, the signal and the compressed signal transmitted from the transmission portion, a digital video signal decompression portion that decompresses the compressed signal thus received into an original, uncompressed digital video signal, a first clock generation portion that can vary a frequency of a clock generated thereby within a predetermined first range, a second clock generation portion that can vary a frequency of a clock generated thereby within a second range that is different from the first range, and a selection portion that selects one of the first and second clock generation portions based on the measurement result, and wherein the digital video signal decompression portion performs decompression by using the clock generated by the clock generation portion selected by the selection portion.

2. The wireless video transmission system of claim 1, wherein the selection portion selects one of the first and second clock generation portions based on a result of comparison between the frequency of the synchronizing signal measured by the synchronizing signal frequency measurement portion and a predetermined first threshold value.

3. The wireless video transmission system of claim 1, further comprising:

a notification portion that provides notification of information according to a result of comparison between the frequency of the synchronizing signal measured by the synchronizing signal frequency measurement portion and a predetermined second threshold value.

* * * * *